(12) United States Patent
Erämaa et al.

(10) Patent No.: US 10,378,437 B2
(45) Date of Patent: Aug. 13, 2019

(54) SYSTEM AND METHOD FOR GENERATING ELECTRIC ENERGY

(71) Applicant: Finno Energy Oy, Lahti (FI)

(72) Inventors: Timo Erämaa, Helsinki (FI); Heikki J. Salminen, Vaasa (FI)

(73) Assignee: Finno Energy Oy, Lahti (FI)

(*) Notice: Subject to any disclaimer, the term of this patent is extended or adjusted under 35 U.S.C. 154(b) by 48 days.

(21) Appl. No.: 15/310,231

(22) PCT Filed: May 20, 2015

(86) PCT No.: PCT/FI2015/050346
§ 371 (c)(1),
(2) Date: Nov. 10, 2016

(87) PCT Pub. No.: WO2015/177409
PCT Pub. Date: Nov. 26, 2015

(65) Prior Publication Data
US 2017/0138257 A1 May 18, 2017

(30) Foreign Application Priority Data
May 21, 2014 (FI) .................... 20145458

(51) Int. Cl.
*F02C 1/00* (2006.01)
*F01D 15/10* (2006.01)
(Continued)

(52) U.S. Cl.
CPC .............. *F02C 1/007* (2013.01); *F01D 15/10* (2013.01); *F01K 21/047* (2013.01); *F02C 5/12* (2013.01);
(Continued)

(58) Field of Classification Search
CPC ............ F02C 3/34; F02C 3/30; H02K 7/1823
(Continued)

(56) References Cited

U.S. PATENT DOCUMENTS

| 1,921,132 A | 8/1933 | Pawlikowski |
| 2,095,984 A | 10/1937 | Holzwarth |

(Continued)

FOREIGN PATENT DOCUMENTS

| EP | 1942270 A2 | 7/2008 |
| GB | 418184 A | 10/1934 |

(Continued)

OTHER PUBLICATIONS

PCT Written Opinion prepared by the European Patent Office for PCT/FI2015/050346, dated Nov. 26, 2015, 7 pages.
(Continued)

*Primary Examiner* — Julio C. Gonzalez
(74) *Attorney, Agent, or Firm* — Chernoff Vilhauer LLP

(57) ABSTRACT

An object of the present invention is to provide a method and a system for implementing the method so as to alleviate the disadvantages of a reciprocating combustion engine and gas turbine in electric energy production. The invention is based on the idea of arranging a combustion chamber (10) outside a turbine (22) and providing compressed air from serially connected compressors to the combustion chamber in order to carry out a combustion process supplemented with high pressure steam pulses. The combustion chamber (10) is arranged to receive compressed air from each compressing stage of the serially connected compressors (24) for gradually increasing the amount of compressed air in the combustion chamber (10).

13 Claims, 5 Drawing Sheets

(51) Int. Cl.
*F02C 5/12* (2006.01)
*F02C 6/16* (2006.01)
*F02C 7/10* (2006.01)
*F02C 7/143* (2006.01)
*F02C 9/18* (2006.01)
*F01K 21/04* (2006.01)
*H02K 7/18* (2006.01)

(52) U.S. Cl.
CPC ............... *F02C 6/16* (2013.01); *F02C 7/10* (2013.01); *F02C 7/143* (2013.01); *F02C 9/18* (2013.01); *H02K 7/1823* (2013.01); *F05D 2260/14* (2013.01); *F05D 2260/16* (2013.01); *F05D 2260/601* (2013.01); *F05D 2270/14* (2013.01); *Y02E 20/14* (2013.01); *Y02E 20/16* (2013.01); *Y02E 60/15* (2013.01); *Y02T 50/675* (2013.01)

(58) Field of Classification Search
USPC ....... 290/52; 60/39.17, 39.11, 39.15, 39.163, 60/772
See application file for complete search history.

(56) References Cited

U.S. PATENT DOCUMENTS

| | | | |
|---|---|---|---|
| 2,861,422 A | 11/1958 | Magill | |
| 3,585,795 A | 6/1971 | Grieb | |
| 3,831,373 A * | 8/1974 | Flynt | F02C 6/16 290/52 |
| 5,661,968 A * | 9/1997 | Gabriel | F01K 23/06 60/39.182 |
| 6,003,298 A * | 12/1999 | Horner | F01D 17/145 60/39.182 |
| 8,015,792 B2 * | 9/2011 | Raver | F02C 7/264 60/247 |
| 2002/0046560 A1 * | 4/2002 | Anderson | F02C 3/02 60/39.39 |
| 2007/0256422 A1 | 11/2007 | Wakefield et al. | |
| 2011/0100017 A1 * | 5/2011 | Kou | F02C 3/26 60/776 |
| 2012/0180499 A1 | 7/2012 | Intile | |
| 2012/0210723 A1 | 8/2012 | Wettstein | |
| 2015/0275691 A1 * | 10/2015 | Keogh | F02C 3/073 290/52 |

FOREIGN PATENT DOCUMENTS

| | | |
|---|---|---|
| WO | 2012/128925 A2 | 9/2012 |
| WO | 2014/020236 A1 | 2/2014 |

OTHER PUBLICATIONS

Search Report prepared by the Finnish Patent and Registration Office for FI 20145458; dated Dec. 22, 2014, 2 pages.

\* cited by examiner

_US 10,378,437 B2_

SYSTEM AND METHOD FOR GENERATING ELECTRIC ENERGY

CROSS-REFERENCE TO RELATED APPLICATIONS

This is a national stage application filed under 35 USC 371 based on International Application No. PCT/FI2015/050346 filed May 20, 2015 and claims priority under 35 USC 119 of Finnish Patent Application No. 20145458 filed May 21, 2014.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates to a method of generating electricity and to electric generator system.

BACKGROUND OF THE INVENTION

A typical electric generator system of the prior art consists of a combustion engine, a fuel tank and a generator The combustion engine comprises a set of cylinders with a corresponding set of reciprocating pistons. One of the problems associated with the above arrangement is that the moving pistons and other moving parts have to be constantly lubricated with oil which has a significant impact on running temperature of the combustion engine. Consecutively, the running temperature is a significant factor when considering the coefficient of efficiency. The above mentioned engine withstands running temperature of less than 100 degrees Celsius without a significant deterioration of durability. The temperature is too low for vaporizing water and therefore it cannot be efficiently used for generating electricity i.e. it is just waste heat.

U.S. Pat. No. 2,095,984 (H. Holzwarth) discloses an explosion turbine plant. The explosion turbine plant comprises an impulse rotor, pistonless explosion chambers for generating explosion gases and nozzles for expanding and directing the gases to a rotor being driven exclusively by intermittent puffs of said gases.

Another typical generator system of the prior art consists of a gas turbine and a generator driven by a shaft of the gas turbine. The problem with gas turbines is that the combustor is in relatively low pressure because the gas turbine's combustor is practically an open space. The low pressure of the combustor significantly drops the coefficient of efficiency. In Holzwarth turbine plant the intermittent low pressure significantly drops the coefficient of efficiency.

BRIEF SUMMARY OF THE INVENTION

An object of the present invention is thus to provide a method and a system for implementing the method so as to alleviate the above disadvantages.

The invention is based on the idea of arranging a combustion chamber outside a gas turbine and providing compressed air to the combustion chamber in order to carry out a combustion process in controlled and optimal conditions and use residue heat from the process. Controllable input valves are arranged to control the periodic combustion process to match a frequency of specific gas oscillations so that these amplify each other.

An advantage of the method and system of the invention is that the conditions in the combustion chamber may be optimized for the combustion process which significantly increases overall efficiency of the system. The combustion chamber may have running temperature of hundreds of degrees Celsius and the pressure inside the compression chamber may be similar to the pressure in the end of compression stroke in a diesel cycle of a reciprocating combustion engines. Such a temperature increases the efficiency of the combustion process and the heat may be easily converted to electricity due to the high temperature.

BRIEF DESCRIPTION OF THE SEVERAL VIEWS OF THE DRAWINGS

In the following the invention will be described in greater detail by means of preferred embodiments with reference to the attached drawings, in which.

DETAILED DESCRIPTION OF THE INVENTION

Figure 1:
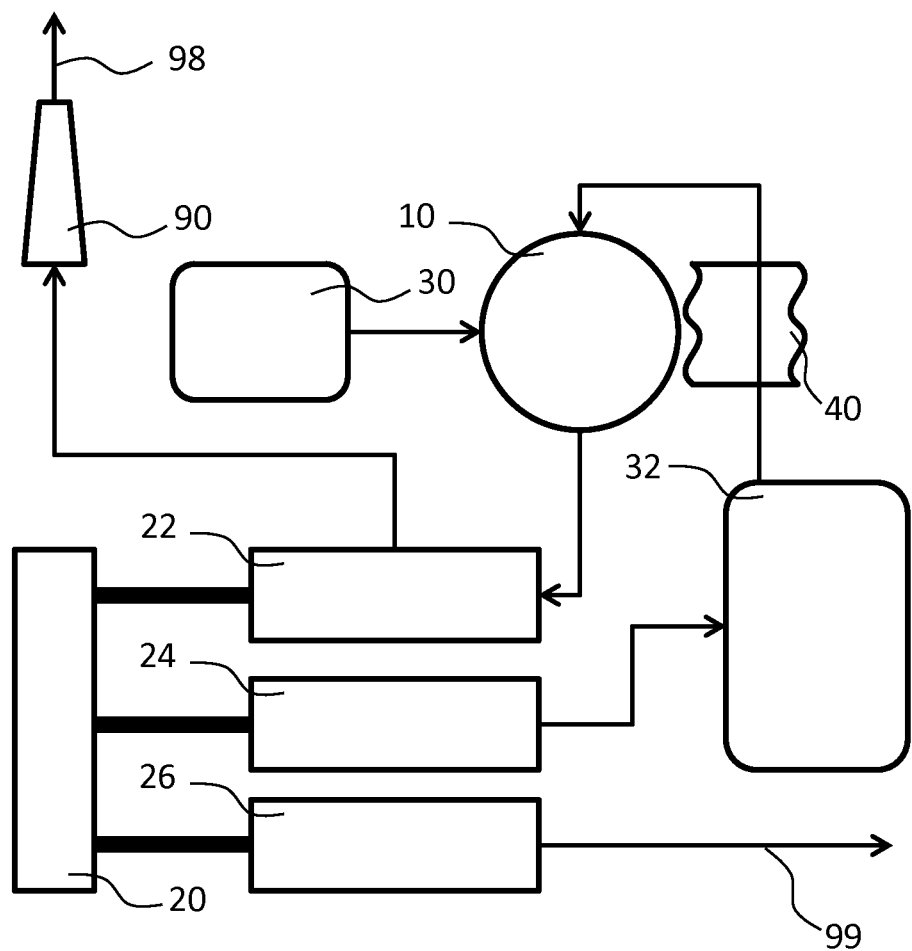
FIG. 1 illustrates a first electric generator system according to an embodiment of the invention.

Referring to a simple example of FIG. 1, the electric generator system comprises a turbine 22 which is connection with a generator 26 and a compressor 24 axially or via a transmission 20. The generator may also be axially connected to the turbine 22. A rotor of the turbine 22 rotates when energy is fed to the turbine by means of fluid flowing through the turbine. Rotation of the turbine rotor drives the transmission 20 and the generator 26 and the compressor 24 which both are connected to the transmission. The turbine, the generator and the compressor may be connected to the transmission by means of drive shafts, axles or other suitable power transmission means. The arrangement converts the energy fed to the turbine 22 into electric energy output 99 with the generator 26 and into air pressure with the compressor 24 which compresses air for the combustion chamber 10. In an embodiment the compressor 24 accumulates compressed air into an air tank 32 which then feeds the combustion chamber 10 with the compressed air accumulated in the air tank 32. The compressor 24 is preferably a screw compressor which is highly efficient and able to provide high pressure to the combustion chamber 10 and to the air tank 32. In an embodiment, the system comprises a second screw compressor connected in series with the first screw compressor 24 to provide even higher pressure to the air tank. In an embodiment, the system comprises a combination of an axial compressor 24, such as a radial compressor and a screw compressor connected in series with the axial compressor 24 to provide air to the air tank. One or more or all of the compressors can be for example axial, radial, screw, piston or some other type of compressor. The series of compressors can be a combination of one or more of said compressor types connected in parallel or in series. The compressor or the compressors are preferably arranged to build up pressure of over 20 bars to the air tank. In an embodiment, the compressor or the compressors are arranged to build up pressure of over 30 bars, 35 bars or 40 bars to the air tank. In an embodiment the compressor 24 may be driven with an electric motor. In an embodiment an intercooler can be provided between the series-connected first compressor and the second compressor to cool down the air between the compressors. In an embodiment intercoolers can be provided between some or all of the series-connected compressor stages to cool down the air between the compressors. The intercooler can then be used to generate steam which can be injected into the combustion chamber in a form of short, high pressure steam pulses between expansion phases of the combustion cycle. Preferably the combustion inside the combustion chamber is deflagration combustion, not detonation combustion.

The electric generator system also comprises a combustion chamber 10 which is arranged to receive compressed air from the compressor 24 or from the air tank 32 and fuel from a fuel tank 30 to initiate a combustion process. The compressed air is released from the air tank into the combustion chamber 10 by means of a controllable valve. The compressed air is preheated before entering the combustion chamber with a heat recovery unit 40 which conveys heat from the combustion chamber to the compressed air. A regenerator can be used after the last compressor to heat up the compressed air before it is fed to the combustion chamber or to a by-pass duct which bypasses the combustion chamber. The regenerator may use waste heat from e.g. exhaust gas or combustion chamber for heating up the compressed air. The compressed air may also be preheated with other means, for example electrically with a resistor, when the system is started and the combustion chamber is at room temperature. Fuel is released or pumped from the fuel tank and injected into the combustion chamber. The fuel is preferably diesel or liquid natural gas (LNG). In an embodiment, the fuel is gasoline, natural gas, ethanol, biodiesel or a mixture of two or more the preceding fuels. In an embodiment, the fuel comprises hydrogen and carbon monoxide mixture which is a by-product of a soda recovery unit. In an embodiment water or steam may be injected with fuel into the combustion chamber. In an embodiment the fuel comprises coal dust or brown coal dust as such or mixed to natural gas, diesel or some other suitable fuel.

The fuel injected into the combustion chamber ignites due to high pressure and temperature inside the combustion chamber. The high pressure in the combustion chamber is arranged by releasing air from the air tank to the combustion chamber. In addition to the preheating, the heat of the combustion chamber heats up the released air inside the combustion chamber and builds up even higher pressure. The ignition may be triggered with an ignition coil, a glow plug, a pre-glow arrangement or a heater arrangement when the system is started and the combustion chamber has not yet reached its running temperature. In an embodiment the system comprises an antechamber or a pre-combustion chamber. A fuel mixture can be ignited in the pre-combustion chamber to initiate the combustion process. The combustion process produces heat which heats up the combustion chamber and keeps the combustion process running by heating the fuel and the compressed air which are introduced into the combustion chamber. In an embodiment the ignition is also used during the combustion cycle after the system is started. In an embodiment the heat recovery unit 40 or other means of heat extraction is used to convey heat from the combustion chamber or combustion process to water or steam and generate high pressure steam. The high pressure steam is injected into the combustion chamber between the expansion phases of the combustion process. The steam is injected in short, high pressure pulses and the amount of pulses between two expansion phases may be for example 1 to 10, 2 to 8, 3 to 6 or some other amount, such as 4, 5, 7 or 8.

In an embodiment the system comprises means, such as heat exchangers, for producing heat to a district heating system. Some of the thermal energy that the electric generator system produces can be extracted from the system and transferred with heat exchanger to heating water of a district heating system. This combined production of electrical and thermal energy raises the overall efficiency of the system.

In an embodiment the system comprises means, such as heat exchangers, for using the thermal energy of the electric generator system to run a absorption cooling system. Some of the thermal energy that the electric generator system produces can be extracted from the system and transferred with heat exchanger to absorption cooling system which in areas of warm climate may raise the overall efficiency of the system.

The combustion chamber 10 is preferably a hollow container with input means for fuel and compressed air and an output for combustion products i.e. exhaust gas. The inputs and the output are controllable and may be closed and opened in specific phases of a combustion cycle in order to build up pressure into the combustion chamber before the ignition of the fuel and to expel combustion products after the ignition. Input and output can be understood as an inlet and an outlet, respectively, but the terms input and output are used throughout this text. One or more valves can be used to control flow to and from the combustion chamber. In an embodiment one or more of the input and/or output valves are so called radial valves i.e. located radially around the combustion chamber cover. The input valves can be fixed to an inclined position to the combustion chamber i.e. not perpendicular to the combustion chamber wall. The inclined position of a valve produces a whirl of gas in the combustion chamber when the gas is injected through the inclined valve. This type of whirl can be controlled with the inclined valves whereas random whirls produced by perpendicularly positioned valves are very difficult if not impossible to control. The input valves can be used to control the whirl by selecting suitable inclination angles and/or by timing openings of the valves. The combustion process in the combustion chamber is a cycle process which at least resembles Diesel cycle. Preheated compressed air from the air tank is introduced into the combustion chamber and fuel is injected into the combustion chamber until the air-fuel mixture ignites. The combustion of the air-fuel mixture expands its volume so the combustion products and the compressed air are expelled through the output when output valve is opened. Running speed of the combustion cycle is controlled by controlling the input and output valves. The running speed may be chosen freely within certain limits which are defined by the properties of the system. Such properties that may limit the running speed may be for example operation speed of the valves, the air pressure in the air tank, fuel type, etc. However, the running speed may be adjusted for optimal performance in each system because it is not restricted by moving pistons or similar physical limitations of moving mass.

The combustion chamber has preferably a simple form, most preferably a sphere or a cylinder, for enabling a quick, clean and complete combustion process. The simple form enables higher running temperatures which increases efficiency and decreases the amount of harmful particles and gases produced during the combustion process. The combustion chamber is arranged to function in high temperatures. In addition to the simple form, also the material of the combustion chamber has to withstand high temperatures without significant deterioration of performance or durability. The material of the combustion chamber may be ceramic, metal, alloy or preferably a combination of two or more materials. For example, the combustion chamber may comprise an alloy encasing with a ceramic inner coating. The alloy encasing withstands high pressure and strong forces while the ceramic inner coating withstands high surface temperatures. The construction of the combustion chamber is preferably arranged to withstand running temperature of 400 degrees of Celsius. In an embodiment the combustion chamber is arranged to withstand running temperature of 500, 600, 700 or 800 degrees of Celsius. The combustion chamber itself does not comprise any moving parts so it is relatively simple task to design the combustion chamber to withstand high temperatures. The moving parts that experience the highest thermal stress are the valves at the input and output ports of the combustion chamber. However, there are valves readily available that are designed to operate in these temperatures and therefore it should be relatively easy task to design and realize a durable valve system.

The output of the combustion chamber 10 leads a stream consisting of the combustion products and the compressed air from the combustion chamber into the turbine 22. Due to the high pressure in the combustion chamber, the stream is expelled with high velocity when the output is opened. The expelling of the combustion products may be enhanced by having the output and the air input open simultaneously for a certain period of time. The turbine 22 comprises a rotor which rotates when the stream flows through the turbine. The rotating rotor drives the transmission 20 which in turn drives the generator 26 and the compressor 24 as stated earlier. The stream is guided to exhaust pipe 90 after the turbine and the exhaust gas 98 is released from the system.

The combustion chamber 10 is preferably a separate unit outside the turbine 22. The combustion products expelled from the combustion chamber 10 are guided to the turbine 22 with a pipe, tube or some other channel connecting the combustion chamber 10 and the turbine 22. In an embodiment the system comprises multiple combustion chambers. In that case each combustion chamber has a pipe, tube or some other channel connecting that combustion chamber to the turbine 22. Preferably the multiple combustion chambers are arranged to expel their combustion products sequentially, i.e. not all at the same time, to provide a steadier flow of combustion products to the turbine 22. In an embodiment, the steadier flow to turbine 22 is accomplished with short, high pressure steam pulses which are injected into the combustion chamber between the expansion phases of the combustion process.

In an embodiment the generator 26 feeds an electric storage system which comprises one or more capacitors, super capacitors or batteries for storing the electrical energy produced by the generator. This type of system can be used in vehicular applications for producing and storing electrical energy for electrical motors of a vehicle.

Figure 2:
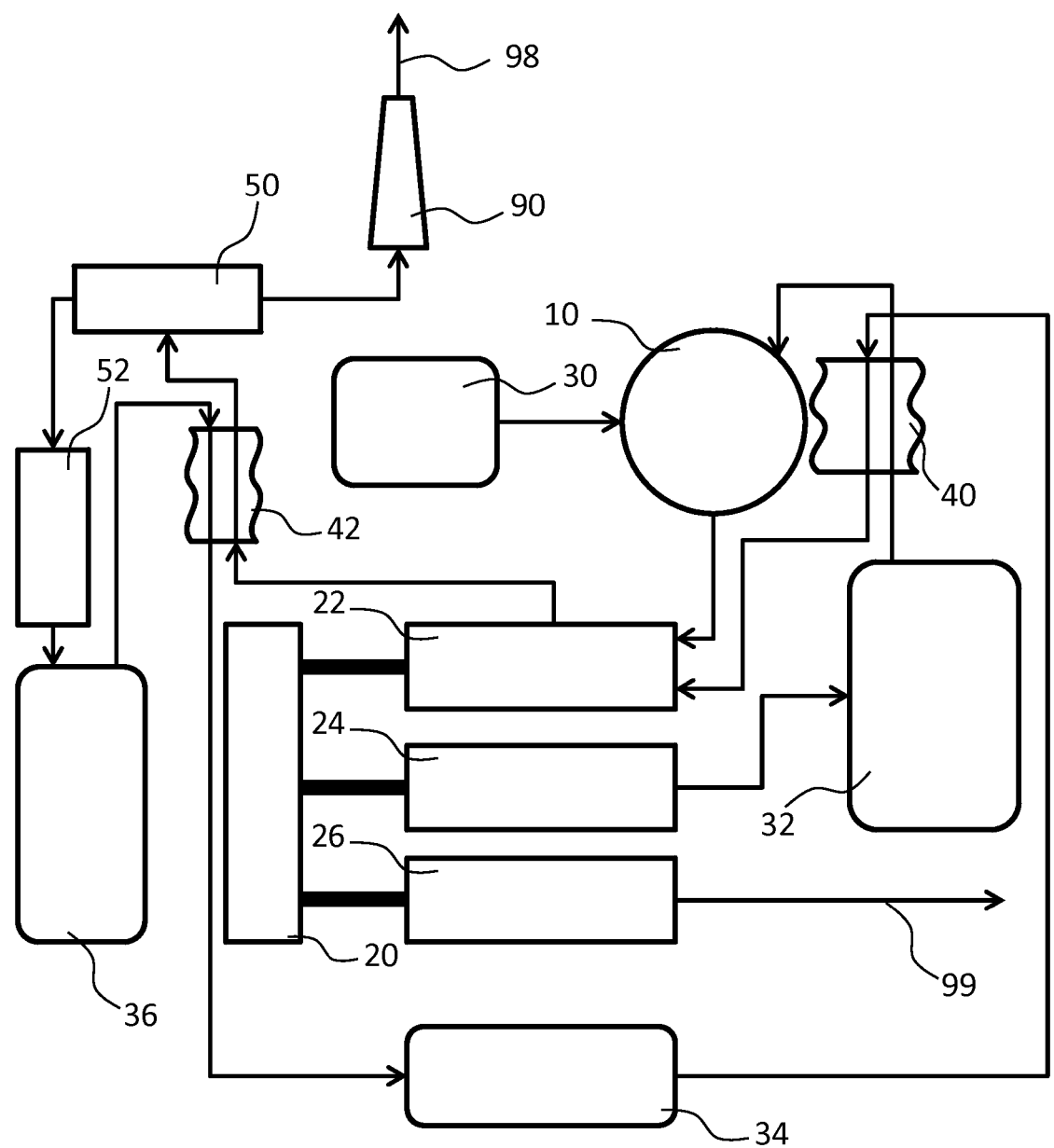
FIG. 2 illustrates a second electric generator system with steam circulation system according to an embodiment of the invention.

Now referring to FIG. 2, in an embodiment the electric generator system further comprises a steam circulation system. The steam circulation system comprises a steam tank 34, a heat recovery unit 40, a heat exchanger 42, a condenser 50 and a water tank 36. In an embodiment, the steam circulation system further comprises a second turbine. Water and steam circulates in the steam circulation system wherein the water is accumulated into the water tank 36 and the steam is accumulated into the steam tank 34. In an embodiment the steam tank and the water tank is a single tank wherein the water is accumulated in the bottom of the tank and steam is accumulated on the top of the tank. The flowing of the steam is based on pressure differences within the system but it might be assisted with pumps or similar arrangement if necessary. The flowing is controlled by means of a number of valves which may be operated in controlled manner.

The steam is arranged to flow from the steam tank 34 to the heat recovery unit 40. The heat recovery unit 40 is in thermal connection with the combustion chamber 10 so that the combustion chamber heats up the heat recovery unit in which the heat is conveyed to the steam flowing through the heat recovery unit. The heat recovery unit may be a separate unit having a thermal connection to the combustion chamber or it may be a fixed part of the combustion chamber. In an embodiment the heat recovery unit may even a pipework inside the combustion chamber or tubing on the surface of the combustion chamber. When the heat from the combustion chamber is conveyed to the steam flowing through the heat recovery unit, the steam rapidly heats up and expands. The steam flow is then directed to the turbine 22 wherein the steam flow rotates the rotor of the turbine 22 simultaneously with the combustion products and compressed air which are expelled from the combustion chamber 10 into the turbine 22.

In an embodiment a heat pump can be used to produce steam. Heat pumps are known to be effective when needed temperature difference is small. A heat pump is therefore a good alternative for adding thermal energy to water which is at or near its boiling point. For example an air-to-water or water-to-water heat pump can be used for producing steam from water that is preheated to near or at its boiling point. The steam production can be assisted with other energy sources, including those already mentioned, in addition to the heat pump. In an embodiment steam of exhaust flow is condensed into water and the heat released from the condensing is used as a heat source for the heat pump. The temperature where the condensing takes place depends on the pressure of the exhaust gas and steam. Said temperature is 100 degrees Celsius in atmospheric pressure but in higher pressure it can be for example as high as 200, 300, 400 or even 500 degrees Celsius. The heat pump uses the heat to vaporize water for providing fresh steam to the system. In an embodiment heat provided by one or more intercoolers of the system is used as a heat source for the heat pump.

In an embodiment the heat recovery unit 40 is replaced with heat insulating material and time-dependent steam injections to the combustion chamber 10 maintain a stable running temperature of the combustion chamber. The time-dependent steam injections are preferably short, high pressure steam pulses injected into the combustion chamber between expansion phases of the combustion process. The injected high pressure steam pulses need only a reduced amount of steam due to their short pulse type length. After injection the steam exits the combustion chamber and enters into the turbine 22.

In an embodiment the system comprises an additional burner for increasing the amount and/or the temperature of the steam in the system. The burner preferably uses the same type of fuel as the rest of the system. The fuel is burned in the burner for producing heat which then heats steam and/or the burning fuel heats water to produce steam. The additional burner can be used in systems which do not produce enough "waste heat" to produce an adequate amount of steam. The use of the additional burner ensures that a desired amount of steam in a desired temperature and pressure can be achieved.

In an embodiment, the steam is not directed into the same turbine 22 as the combustion products. In that embodiment the system comprises a second turbine which is dedicated to the steam stream while the (first) turbine 22 is dedicated to the stream of combustion products and compressed air. The stream of combustion products and compressed air may even be arranged to flow through an additional heat exchanger after the turbine 22 to heat up the steam stream before that stream enters the second turbine. The arrangement of the second turbine may be similar to known combined cycle power plants.

From the turbine a stream of steam, compressed air and combustion products flows through the heat exchanger 42 to the condenser 50 wherein the steam is condensed into water and the compressed air and the combustion products are guided out of the system through exhaust pipe 90. In the embodiment of the second turbine the stream of combustion products and compressed air is arranged to flow through heat exchanger 42 directly to exhaust pipe and the steam stream is arranged to flow through the heat exchanger 42 and the condenser 50 to the water tank 36.

Condensing water from the exhaust flow may cause accumulation of impurities to the system which is undesirable. In an embodiment this is solved by feeding the condenser with fresh, atmospheric air from which relatively clean water can be condensed to the system.

The water condensed from the steam and/or from the atmospheric air flows into the water tank 36 or is pumped in there. An ion exchanger 52 may be arranged between the condenser 50 and the water tank 36 for purifying the water before it enters the cycle again. The water tank 36 accumulates water which is then guided or pumped to the heat exchanger 42. The heat exchanger conveys the heat from the stream of steam, compressed air and combustion products to the water flowing through the heat exchanger. The heat of the heat exchanger vaporizes the water into steam which is then guided to flow back into the steam tank 34. From the steam tank 34 the high pressure steam can be released in short bursts to create short, high pressure pulses to the combustion chamber.

Figure 3:
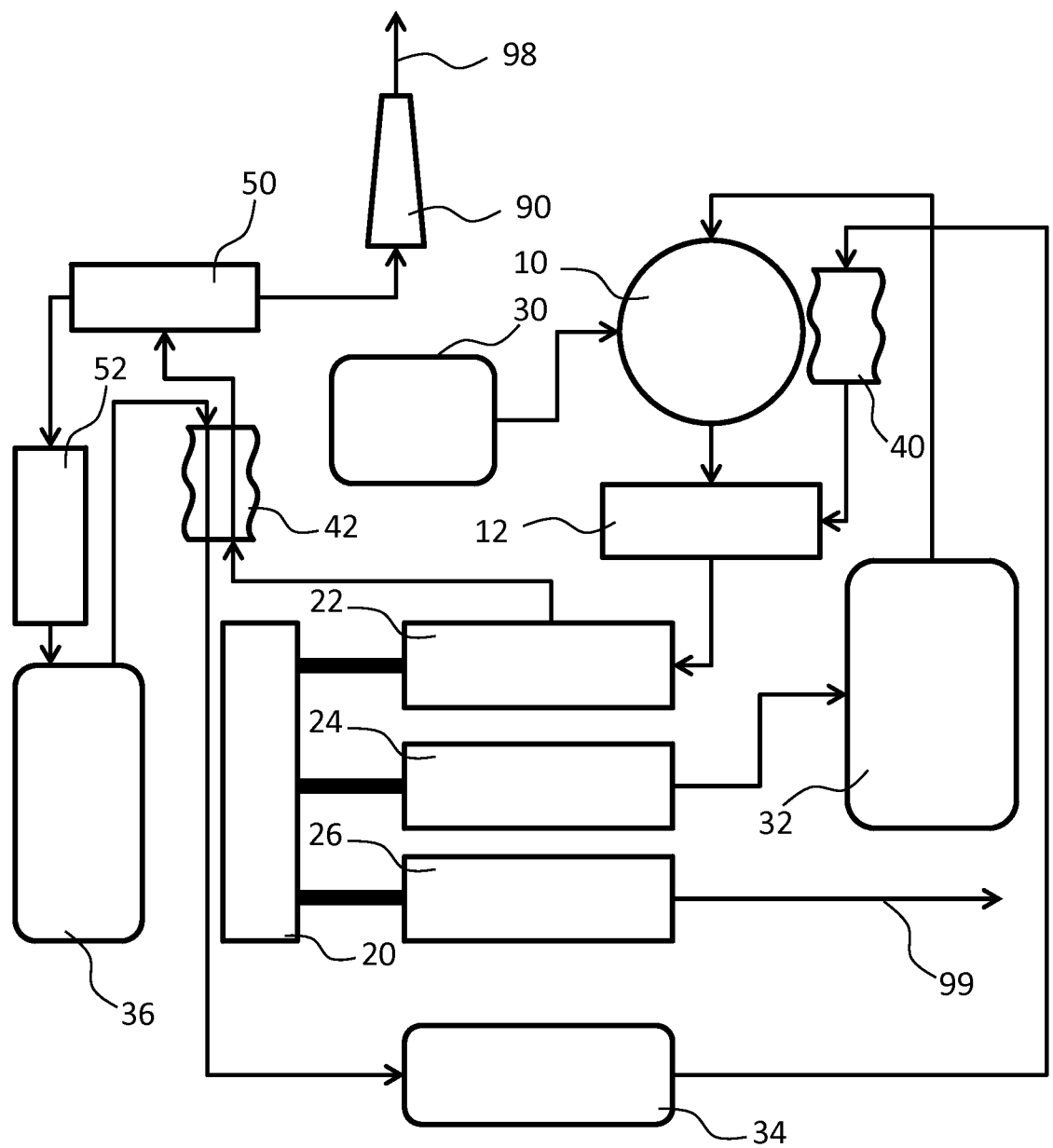
FIG. 3 illustrates a third electric generator system with an injector or ejector system according to an embodiment of the invention.

FIG. 3 illustrates an electric generator system which is otherwise similar to the system of FIG. 2 except that the system further comprises a pump having a converging-diverging nozzle, for example an injector or ejector 12 for combining the stream of combustion products from the combustion chamber 10 and the steam from the heat recovery unit 40 or from the heat exchanger 42 wherein the ejector 12 guides the steam and combustion products into the turbine 22 for rotating the rotor of the turbine. The pump having a converging-diverging nozzle is called an ejector within the description but in an embodiment the pump can also be for example an injector, steam injector or steam ejector. The ejector 12 is between the turbine and the combustion chamber and its heat recovery unit. The combustion products and the compressed air are expelled into the ejector wherein the steam from the heat recovery unit is superheated by the hot matter from the combustion chamber. The superheating of the steam causes rapid expansion of the steam. The ejector 12 guides the stream of superheated steam, combustion products and compressed air into the turbine 22 wherein the stream rotates the rotor of the turbine. In an embodiment, short, high pressure steam pulses are injected into the ejector 12 from where the steam flows to the turbine and rotates the rotor or the turbine. In an embodiment an afterburner can be used in the ejector 12 between the combustion chamber 10 and the turbine 22. However, the temperature of the exhaust gas has to be monitored and controlled since the input gas of the turbine should preferably have a low temperature and the afterburner rises the temperature of the exhaust gas. In an embodiment the afterburner is used intermittently and not continuously.

In an embodiment the system also comprises an adjustable nozzle and a valve in connection with the ejector 12 and the output of the combustion chamber 10 for adjusting the expelling of combustion products from the combustion chamber 10. The nozzle has a certain design and a form which may be altered. The nozzle is within the ejector in a by-pass flow of the steam flowing from the heat recovery unit 40 to the turbine 22. The form of the nozzle has a significant impact to the expelling of the combustion products from the combustion chamber when the valve in the output is open. By altering the form of the nozzle the expelling of the combustion products may be increased with help of the by-pass flow of the steam.

In an embodiment a portion of the combustion products, i.e. the exhaust gas, is guided to a low temperature/pressure region of the turbine 22 or to a low pressure turbine when the exhaust gas is exhaust from the combustion chamber. An ejector or ejectors (14*a*, 14*b*) can be omitted in this embodiment since the pressure in suction side is higher than the pressure in low temperature/pressure region.

Figure 4:
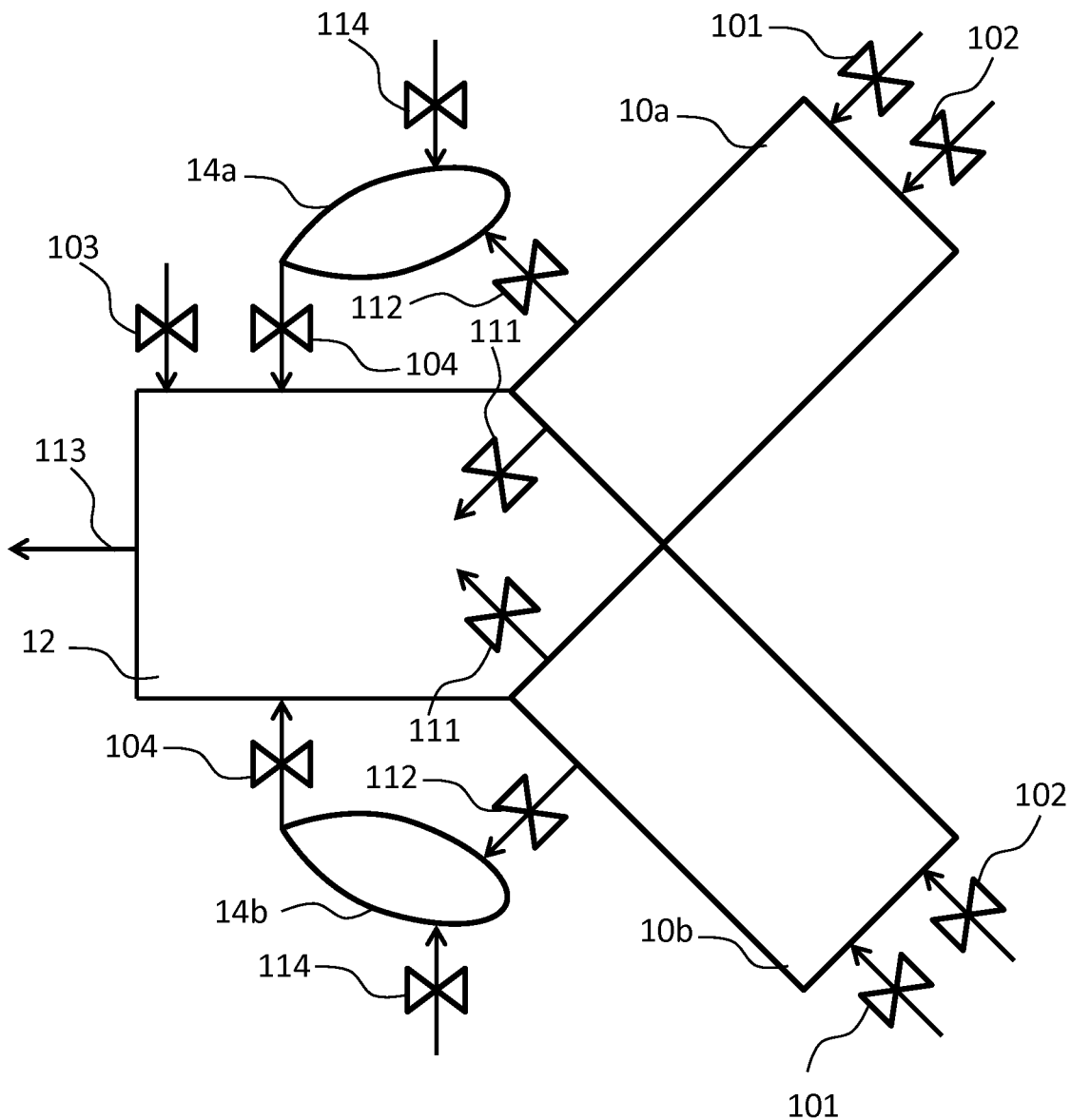
FIG. 4 illustrates a detail of a system having two combustion chambers.

FIG. 4 illustrates a detail of an embodiment of a combustion system having two combustion chambers 10*a* and 10*b* and an ejector 12. The number of combustion chambers and ejectors is not limited to this example. Two combustion chambers and one ejector were chosen for this embodiment to give an example and represent the capabilities of the system. In an embodiment the electric combustion system has one, two, three, four or more combustion chambers and zero, one, two, three, four or more ejectors. In an embodiment the ejectors are not essential and the system can operate without a single ejector.

Each combustion chamber 10*a*, 10*b* comprises one or more inputs 101, 102 which can be controlled with or without input valves and one or more outputs 111, 112 which can be open or controlled with output valves. The inputs and the outputs may be controlled without valves by controlling the pressure of the inputs and outputs because gases tend to flow from a higher pressure region to a lower pressure region. In an embodiment at least some of the inputs and outputs are controlled with gas vibrations or oscillations instead of valves. Movement of gas in a pipeline tends to oscillate with a frequency or a plurality of frequencies which is/are specific to the pipeline and the gas, so called eigenfrequencies. The pulse action is created by the periodic combustion and fortified by the eigenfrequencies of the flow system. Specific oscillation frequencies can be exploited by controlling the periodic combustion process to match the frequency of the specific gas oscillation so that these amplify each other. In an embodiment the combustion cycle is matched with the specific oscillation frequency of the compressed air flowing in the system. In an embodiment valve actuation is optimized to harmonize with the desired periodical operation of the pulse turbine. In an embodiment the combustion cycle, the specific oscillation frequency of the compressed air flowing in the system and a specific oscillation frequency of the steam flowing in the system are all matched to the same phase so that they amplify each other. The specific oscillation frequencies of the steam and the compressed air flows can be matched with pipeline design. In an embodiment the combustion cycle is matched with the specific oscillation frequency of the compressed air flowing in the system and with the specific oscillation frequency of the steam flowing in the system but the specific frequencies of the steam and the compressed air are not matched with each other. Preferably the flow system is optimized such that the flow losses are minimized.

In an embodiment the system comprises compressors connected in series to produce high pressure compressed air to the combustion chamber. A typical way is to feed compressed air from the first compressor to the second compressor and from the second compressor to the third compressor, and so on. The pressure of the compressed air builds up in each compressor stage and finally the compressed air from the last compressor of the series of compressors is released to the combustion chamber. This is energy consuming as the amount (mass) of compressed air is the same in each compressing stage. A compressing stage can be a single compressor or a number of compressors in parallel connection i.e. each having common input and output. In an embodiment a portion of the mass of the compressed air is released to the combustion chamber and the remaining portion of the mass of the compressed air is released to the following compressor in the series of compressors. The pressure within the combustion chamber rises gradually as the compressed air is released to the combustion chamber between compressing stages. Heat can be extracted from the compressed air between the compressing stages by using one or more intercoolers. Also the amount of air to be compressed diminishes in subsequent compressing stages as part of the air is released to the combustion chamber between the compressing stages. A plurality of pressure tanks can be used for storing compressed air in various pressures between atmospheric pressure and the highest pressure from the last compressor. A further advantage is that the gradual air feeding allows the other inputs to be fed to the combustion chamber during a desired pressure. For example the combustion chamber could first receive a first release of compressed air, then a fuel input, then a second release of compressed air, then a steam input and finally a third release of compressed air to a desired final pressure. The order and timing of the inputs can be optimized based on the system variables.

In an embodiment each combustion chamber comprises an output controlled by a main exhaust valve 111. In an embodiment each combustion chamber comprises two outputs, one output being controlled by a main exhaust valve 111 and one output being controlled by an auxiliary exhaust valve 112. In an embodiment each combustion chamber comprises an open output which is not controlled by valve. In an embodiment each combustion chamber comprises an input 101 for fuel. In an embodiment each combustion chamber comprises inputs 101, 102 for fuel and pressurized air. In an embodiment each combustion chamber comprises inputs for fuel, pressurized air and steam. In an embodiment each combustion chamber comprises inputs for one or more of the following: fuel, pressurized air, steam and water. The steam may be produced at least partially using waste heat of the combustion process of the system. In an embodiment, the steam is injected in the form of short, high pressure steam pulses which are injected into the combustion chamber between the expansion phases of the combustion process. In this embodiment, the exhaust valves may be omitted as the pressure and temperature conditions of the combustion chamber are controlled with the steam pulse injections. In an embodiment steam is injected into combustion chamber and/or to the ejector 12 and to the turbine 22. When both combustion chambers outputs are closed, steam can be injected directly into the ejector 12. In an embodiment, an ORC turbine or a Stirling engine can be used after the heat exchanger for cooling the exhaust gas and steam in a temperature range of about 200 degrees Celsius.

A combustion cycle in the system of FIG. 4 could have the following steps. First pressurized air is fed to the combustion chambers 10a, 10b via air inputs 102 and fuel is fed to the combustion chambers 10a, 10b via fuel inputs 101. In an embodiment fuels, especially gaseous fuels, can be compressed prior to feeding them into the combustion chamber. Fuels like for example carbon monoxide or hydrogen can be fed in a pressure higher than atmospheric pressure to the combustion chamber. The pressure in the combustion chambers is built up due to residue heat until the fuel in the combustion chambers ignites, for example at 20 to 30 bar pressure, and produces combustion products and more pressure. The combustion products and the pressure are released to the ejector 12 by opening the main exhaust valve 111 between a combustion chamber 10a and the ejector 12. In an embodiment the main exhaust valve is omitted and the combustion products move freely to the ejector 12. In an embodiment a pressure wave supercharger replaces the main exhaust valve. Preferably the combustion cycles in each combustion chamber runs with a phase difference to the other combustion chambers so that the exhaust stream from the combustion chambers is steadier and less pulse-like. The combustion products flow from the combustion chamber to the ejector 12 and from ejector to turbine 22 through an output 113. At the same time, liquid water and/or water vapour i.e. steam can be injected to the combustion chamber 10a via inputs and thus improving the ventilation of the combustion products out of the combustion chamber. Preferably steam is injected into the combustion chamber in short pulses with high steam pressure, for example ranging from tens of bars to hundred bars. The injection of steam also helps to keep the pressure in an elevated level for an extended period of time as can be seen from FIG. 5. The injection of water and/or steam also lowers the temperature of the combustion chamber and facilitates temperature controlling. The combustion chamber may have ducts formed within combustion chamber cover for water and/or steam circulation on exhaust side of the combustion chamber. The water and/or steam can be injected into the ducts which water and/or steam then perspirates from small apertures of the ducts. Heat is transferred from the exhaust side of the combustion chamber to the perspirating injected water and/or steam and the combustion chamber cools down. In an embodiment similar ducts and cooling system is used on the main exhaust valve. The injection lowers the temperature of the main exhaust valve 111 which can extend the lifetime of the main exhaust valve 111. When the pressure in the combustion chamber and in the ejector has dropped, for example to 40 to 50 bars, the main exhaust valve 111 is closed. One or more of the valves may be electronically controlled for example via a control unit. In an embodiment the main exhaust valve 111 can be omitted when steam pulses are injected into the combustion chamber so the main exhaust output is constantly open.

In an embodiment including the main exhaust valve, after closing the main exhaust valve 111 the ejector can be sprayed with liquid water and/or water vapour i.e. steam via valve 103 which raise the pressure in the ejector 12, for example to 65 bars. At a certain pressure in the ejector 12, for example 65 bars, the main exhaust valve 111 of the second combustion chamber 10b opens and releases combustion products to the ejector 12 and from there to the turbine 22. At the same time the secondary exhaust valve 112 of the first combustion chamber 10a is kept open to ventilate the residue combustion products from the first combustion chamber 10a. The ventilation can be enhanced by introducing pressurized air or steam via the inputs 101, 102 to the combustion chamber. The secondary exhaust valve 112 may lead the residue combustion products to the turbine 22 via one or more second ejectors 14a, 14b. In an embodiment steam is injected into combustion chamber and/or to the ejector 12 and to the turbine 22. When both combustion chambers outputs are closed, steam can be injected directly into the ejector 12. In an embodiment a single second ejector can comprise multiple inputs so that it can be used with two combustion chambers. Once the first combustion chamber 10a is ventilated and the pressure has dropped to a sufficiently low level, for example to 20, 10, 5 or 2 bars, the secondary exhaust valve 112 is closed and the next cycle of the combustion cycle can begin.

In an embodiment the second ejector 14a, 14b is arranged to receive motive steam or motive gas via input 114. The motive gas is preferably pressurized water vapour for example in 60, 80 or 100 bar pressure. The motive gas is directed through the second ejector 14a, 14b and discharged to the ejector 12 via valve 104. When the motive gas goes through the second ejector it creates a suction effect drawing residue combustion products from a combustion chamber 10a, 10b when output valve 112 connecting the combustion chamber to the second ejector is open. The valve 104 is preferably a control valve. The throughput and/or opening direction of the valve 104 can be adjusted. In an embodiment all excess steam produced within the system can be fed to the turbine via the valve 104 and/or the second ejector 14a, 14b.

In an embodiment a back flow from the turbine 22 using an intermediate steam tapping can be introduced to a third ejector. The back flow or the intermediate steam from the turbine may comprise steam or combustion products or a mixture of steam and combustion products which are introduce to the third ejector. The pressure of the intermediate steam at the third ejector is raised to a sufficient level by using valves and introducing gas such as water vapour to the third ejector. The steam and the combustion products increase the volume of the gas and decrease the temperature of the gas. The mixture of gases is introduced from the third ejector to the ejector 12 for example via the second ejector 14a, 14b and valve 104, or to some other input valve of the system. In an embodiment, an output using an intermediate steam tapping can also be introduced right after the heat exchanger.

In an embodiment the turbine is arranged to rotate a by-pass fan in an aviation application for example replacing turbofan engines of commercial airplanes. In an embodiment the system comprises an oxygen tank connected to the combustion chamber and controlled with a valve. The combustion chamber can be used as a combustion chamber of rocket engine using rocket fuel from the fuel tank and oxygen from the atmosphere in the lower atmosphere so that the oxygen from the oxygen tank can be used in the upper atmosphere where the amount of oxygen is not sufficient for the combustion.

Figure 5:
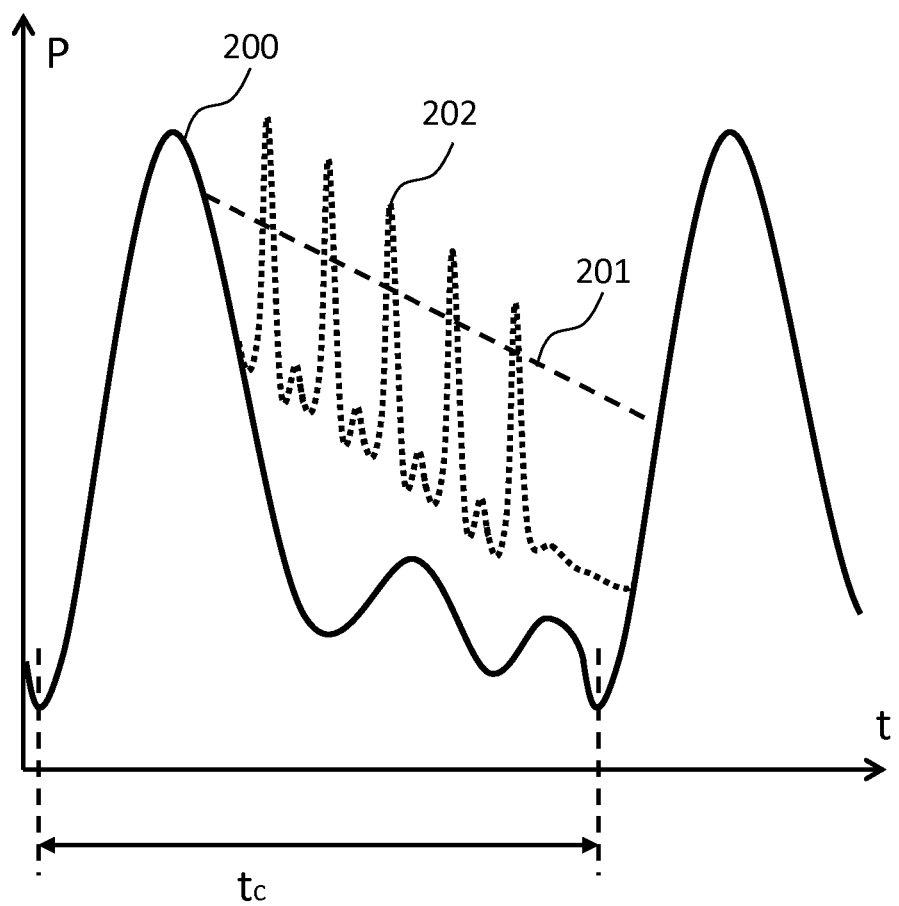
FIG. 5 illustrates the changes in pressure over time in a system according to an embodiment.

FIG. 5 illustrates time dependence of pressure in a system according to an embodiment. As the combustion cycle causes the pressure to change within the system in rather broad range, the turbine 22 does not receive optimal input unless the system in controlled in a time-dependent manner. Preferably all the inputs 101, 102, 103, 104 are controlled in time-dependent manner to keep the output 113 to the turbine in optimal pressure. Without any other time-dependent inputs than fuel and air, the output to the turbine would look like the curve 200 in FIG. 5. In the beginning of the combustion cycle the pressure builds up quickly peaking just before the main exhaust valve 111 is opened which quickly lowers the pressure as the combustion products flow through the turbine. Now if the combustion chamber is injected with liquid water and/or water vapour immediately after the main exhaust valve 111 is opened, the pressure would not fall as quickly because the liquid water would evaporate and the vapour would heat up due to residue heat of the combustion chamber and thus the injection would lessen the impact of opening the main exhaust valve 111. In a similar manner, once the main exhaust valve 111 has been closed, the ejector can be sprayed with liquid water and/or water vapour i.e. steam via valve 103 which raise the pressure in the ejector 12 thus raising the output pressure to the turbine. The amount of liquid water, steam and air is controlled in a time-dependent manner in order to prevent the output to the turbine from dropping too much. Keeping the output to the turbine in an elevated and relatively constant level has a significant impact on the efficiency of the system. The turbine can be driven in optimal operating range most of the time with a relatively constant output whereas the turbine can not make the most out of sparse, short bursts.

The output to the turbine can be maintained in an elevated level with the injection of water, steam and air. This elevated level is illustrated with dashed line 201 in FIG. 5. However, a lot of steam and air is needed to maintain such a high pressure if the main exhaust valve is omitted or kept constantly open. If the injection of steam is in the form of very short and high pressure pulses, the main exhaust valve can be omitted thus simplifying the system and increasing its reliability. Curve 202 represents the pressure level during a combustion cycle when the injections are in the form of short steam pulses. The short steam pulses can maintain the average pressure at a high enough level that the main exhaust valve is not necessary. The short steam pulses may have peak pressure higher than the pressure pulse caused by the combustion. In an embodiment of e.g. two combustion chambers, short steam pulses can be fed to the system (e.g. to the first combustion chamber) after fuel is ignited and combustion products expelled from the first combustion chamber. The feeding of steam pulses can be continued while an exhaust valve of the second combustion chamber is closed. During that time any residue steam and combustion products are flushed from the second combustion chamber. The second combustion chamber is flushed with an input of compressed air which flows through e.g. a secondary exhaust valve 112 which then conveys the air and the residues to e.g. lower pressure turbine. After the flushing the second combustion chamber is filled with compressed air, fuel is injected to the second combustion chamber and the mixture ignites or is ignited. After the fuel is ignited and combustion products expelled from the second combustion chamber, short steam pulses can be fed to the system (e.g. to the second combustion chamber) while the exhaust valve of the first combustion chamber is closed, the first combustion chamber is flushed, filled and ignited like the second combustion chamber earlier, and so on. This enables high enough pressure for efficient use of the turbine throughout the process.

In an embodiment the pressure within the ejector 12 is kept always over for example 20, 30, 40 or 50 bars. In an embodiment the amount of injected water, steam and air and point of time at which those are injected are determined based on measured quantities of the system. Such measured quantities can be for example temperature, pressure, humidity, gas composition, state of a valve or some other process quantity. Said quantities can be measured with e.g. sensors. In an embodiment the amount of injected water, steam and air and point of time at which those are injected are determined based on the phase of the combustion cycle. The time dependent injection of water, steam also increases the reliability of the turbine 22 by controlling the temperature of the gas which is introduced to the turbine 22. The injection of water and steam lowers the average temperature of the gas introduced to the turbine and therefore it allows for higher pressure (and thus higher temperature) to be used in the combustion chamber.

It will be obvious to a person skilled in the art that, as the technology advances, the inventive concept can be implemented in various ways. The invention and its embodiments are not limited to the examples described above but may vary within the scope of the claims.

The invention claimed is:

1. An electric generator system having
   a turbine in connection with a generator and one or more compressors for converting energy fed to the turbine into electric energy with the generator and to compress air with one or more compressors,
   a combustion chamber arranged to receive compressed air from the one or more compressors and fuel from a fuel tank to initiate a combustion process and output combustion products into the turbine for rotating the rotor of the turbine, the combustion process being a cycle process comprising a compression phase and an expansion phase, the combustion process being a constant-volume Humphrey cycle process,
   one or more fuel input valves for providing the fuel to the combustion chamber,
   one or more air input valves for providing the compressed air to the combustion chamber,
   one or more steam input valves for providing steam to the combustion chamber,
   a control unit for controlling said one or more fuel input valves, said one or more air input valves and said one or more steam input valves, whereby
   said one or more fuel input valves and said one or more air input valves are controlled to match the cyclic combustion process to a frequency of specific gas oscillations so that the combustion process cycle and the specific gas oscillations amplify each other,
   said one or more steam input valves are controlled to generate a plurality of time-dependent, short, high-pressure steam injection pulses into the combustion chamber within a single combustion cycle between expansion phases of the combustion process.

2. An electric generator system as claimed in claim 1, wherein the system further comprises:
   a heat exchanger in thermal interaction with the combustion products exhaust from the turbine for transferring heat from the exhaust combustion products into steam.

3. An electric generator system as claimed in claim 1, wherein the system further comprises:
   a steam tank for accumulating steam,
   a condenser for condensing the steam into water, a water tank for accumulating the water, and
   means for pumping the water from the water tank to a heat exchanger for vaporizing the water into steam which is arranged to flow into the steam tank.

4. An electric generator system as claimed in claim 1, wherein said one or more air input valves for controlling the combustion process is/are fixed to an inclined position to the normal of the wall of the combustion chamber so that an input of gas produces a controlled whirl of gas to the combustion chamber.

5. An electric generator system as claimed in claim 1, wherein the system further comprises an air tank for accumulating compressed air from one or more compressors and for providing the compressed air to the combustion chamber.

6. An electric generator system as claimed in claim 5, wherein the system comprises an air tank for accumulating compressed air from each compressing stage of serially connected compressors and for providing the compressed air in various pressures to the combustion chamber.

7. An electric generator system as claimed in claim 1, wherein the fuel used in the system is one of the following group: diesel, gasoline, ethanol, natural gas, liquid natural gas and mixture of hydrogen and carbon monoxide.

8. An electric generator system as claimed in claim 1, wherein the system comprises heating means for preheating the compressed air prior to being introduced into the combustion chamber.

9. An electric generator system as claimed in claim 1, wherein the system comprises a pre-combustion chamber for igniting a fuel mixture in the pre-combustion chamber to initiate the combustion process.

10. A method for generating electric energy comprising:
    providing an input of fuel to a combustion chamber,
    providing an input of compressed air to the combustion chamber,
    providing an input of steam to the combustion chamber,
    providing a stream of combustion products and compressed air from the combustion chamber to a turbine for producing power,
    operating a generator using the power the turbine produces for generating electric energy,
    operating one or more compressors for compressing air for the combustion chamber, and
    controlling the input of fuel and the input of compressed air to the combustion chamber in order to run a combustion cycle process in the combustion chamber, the cycle process comprising a compression phase and an expansion phase and the combustion process being a constant-volume Humphrey cycle process,
    controlling the input of fuel and the input of compressed air to the combustion chamber such that the combustion process cycle matches a frequency of specific gas oscillations so that the combustion process cycle and the specific gas oscillations amplify each other,
    controlling the input of steam to the combustion chamber so that the steam is injected in plurality of time-dependent, short, high-pressure pulses within a single combustion cycle between expansion phases of the combustion process.

11. A method as claimed in claim 10, wherein the method further comprises-extracting heat from the combustion process for producing and heating steam.

12. A method as claimed in claim 10, wherein the method further comprises a step of controlling an ejector input valve for creating steam pulses or water pulses to the ejector located between the combustion chamber and the turbine.

13. A method as claimed in claim 10, wherein the method further comprises a step of flushing residue steam and combustion products from the combustion chamber while a main exhaust valve of the combustion chamber is closed, wherein the combustion chamber is flushed with an input of compressed air which flows through a secondary exhaust valve of the combustion chamber to a lower pressure turbine.

\* \* \* \* \*